United States Patent [19]

Sudo et al.

[11] Patent Number: 4,812,346
[45] Date of Patent: Mar. 14, 1989

[54] OPTICAL DISC BASE PLATE AND PROCESS FOR PRODUCING THE SAME

[75] Inventors: Ryoichi Sudo, Yokosuka; Hiroaki Miwa; Tetsuo Tajima, both of Fujisawa, all of Japan

[73] Assignees: Hitachi Ltd.; Hitachi Maxwell Ltd., both of Tokyo, Japan

[21] Appl. No.: 888,051

[22] Filed: Jul. 22, 1986

[30] Foreign Application Priority Data

Jul. 26, 1985 [JP] Japan .................. 60-164169
Aug. 20, 1985 [JP] Japan .................. 60-181119

[51] Int. Cl.⁴ .................. C08F 2/50; C08F 20/58; C08F 20/20; B32B 3/02
[52] U.S. Cl. .................. 428/65; 522/96; 522/181; 526/301; 264/1.4; 264/2.2
[58] Field of Search .................. 522/96; 526/301; 428/65

[56] References Cited

U.S. PATENT DOCUMENTS

| | | | |
|---|---|---|---|
| 3,899,611 | 8/1975 | Hall | 522/96 |
| 3,989,609 | 11/1976 | Brack | 522/33 |
| 4,214,965 | 7/1980 | Rowe | 522/139 |
| 4,218,294 | 10/1980 | Brack | 522/33 |
| 4,329,421 | 5/1982 | Wisnosky | 430/322 |
| 4,348,456 | 9/1982 | Imanaka | 522/96 |
| 4,456,659 | 6/1984 | Sudo | 428/65 |
| 4,544,625 | 10/1985 | Ishimaru | 522/81 |
| 4,650,845 | 3/1987 | Hegel | 522/96 |

FOREIGN PATENT DOCUMENTS 68632 1/1983 European Pat. Off.
104057 3/1984 European Pat. Off.

*Primary Examiner*—John C. Bleutge
*Assistant Examiner*—A. H. Koeckert
*Attorney, Agent, or Firm*—Antonelli, Terry & Wands

[57] ABSTRACT

The invention discloses an optical disc base plate obtained by curing with irradiation of light a light- or radiation-curable resin composition in which a photo-polymerization initiator is contained in an amount of 0.5 to 5 parts by weight per 100 parts by weight of a resin composition comprising the compounds (1), (2) and (3) mixed in amounts falling in the area defined by lines A-B-C-D-E-A in the triangular diagram of FIG. 1, and a process for producing an optical disc base plate which comprises arranging a stamper carrying an information pattern thereon and a light-transmittable flat plate in opposition to each other so as to form a space therebetween, dividing said space into a main space and a resin reservoiring space by a notching ring provided to the light-transmittable plate so as to form a small clearance at a part of the space, casting a light-curable resin into the entirety of the main space and a part of the resin reservoiring space from an inlet, and curing the resin by irradiation of energy from an external energy source.

9 Claims, 5 Drawing Sheets

OPTICAL DISC BASE PLATE AND PROCESS FOR PRODUCING THE SAME

BACKGROUND OF THE INVENTION

This invention relates to a base plate for optical discs capable of storing, recording and reproducing audio and video information.

The optical disc base plate used for digital audio discs, video discs, optical disc recording media, etc., is an approximately 1 mm thick transparent plate carrying an information pattern formed by grooves and/or pits on the surface.

The following three methods have been typically known for forming these optical disc base plates.

(1) A melt of a high polymeric material such as polycarbonate, polymethyl methacrylate and the like is injected into a mold incorporated with a metal-made stamper having an information pattern of grooves and/or pit, and then said melt in the mold is cooled and molded into a transparent plate carrying the information pattern [see Nikkei Mechanical, page 34 (Feb. 1, 1982), and Nikkei Electronics, page 133 (June 7, 1982)].

(2) A metal-made stamper formed with an information pattern is placed on a plastic or glass-made transparent substrate with a thin layer of a liquid light-curable resin interposed therebetween, then this assembly is irradiated via the transparent substrate with light to cure said light-curable resin, and thereafter the stamper is separated from the layer of said cured resin which is kept adhering to said transparent substrate to thereby obtain a transparent plate having the information pattern (see Japanese Patent Kokai (Laid-Open) Nos. 86756/78 and 152028/80).

(3) A stamper bearing an information pattern and a light-transmittable flat plate are placed parallel to each other to form a space therebetween and a light-curable resin is then cast into said space and cured via said light-transmittable plate by irradiation of light, after which said stamper and light-transmittable plate are removed to obtain a transparent plate of cured resin carrying the information pattern (see Japanese Patent Kokai (Laid-Open) No. 160338/80).

These known methods, however, had the following problems.

(a) The optical disc base plate obtained according to the method (1), although excellent in productivity and workability, is unable to perfectly eliminate the molecular orientation which occurs when the high polymeric material is fluidized and solidified, and consequently optical anisotropy occurs in the base plate to cause noise when the information signal is read or written. There is a tendency that such optical anisotropy in the base plate becomes conspicuous especially when attempting to obtain a heat-resistant base plate by raising the thermal deformation temperature of the plate material, and the obtained plate proves optically defective for practical use. The optical disc base plate obtained by the method (1) also had difficulty in transferring the information pattern faithfully from the stamper to the base plate.

(b) The optical disc base plate obtained from the method (2) has good information pattern transfer characteristics, but since a transparent substrate must be prepared separately, the number of the steps in its production process increases, which results in increasing manufacturing cost. Also, it is difficult to obtain strong adhesion between the transparent substrate and the light-curable resin thereby making it difficult to maintain high reliability for a long period of time under high-temperature, high-humidity conditions.

(c) The optical disc base plate obtained by the method (3), although excellent in workability, etc., involves difficulties in the selection of appropriate light-curable resin and molding conditions, and it is difficult with this method to obtain a base plate having excellent mechanical strength, heat resistance and moisture resistance with minimum optical anisotropy.

According to the method (3) which is most commonly used, a transparent plate made of glass or like material and a stamper having an information pattern are placed parallel and opposed to each other so as to form a space therebetween through an outer peripheral ring secured to the outer periphery of said stamper, then a light-curable resin is cast into said space from an inlet formed at a central part of said stamper, and said light-curable resin is then cured via the transparent plate by irradiation of energy beams from a light source.

The generally used acrylate- or methacrylatetype light-curable resins and polyene- or polythiol-type light-curable resins shrink and are reduced in volume when cured, so that the cured product has sinks or voids in its outer peripheral portion.

In order to solve this problems, various proposals have been made, such as arranging the stamper to be movable (Japanese Pat. Laid-Open No. 160338/80) or using an elastic ring (Japanese Pat. Laid-Open No. 25921/82) to suppress the shrinkage of the cured product.

These methods, however, have their own problems such that the base plate made of the cured product of light-curable resin becomes non-uniform in thickness, making it difficult to control the external dimensions of the base plate, and a slight amount of light-curable resin which has gotten between the outer peripheral ring and the stamper or between said ring and the transparent substrate is improperly cured due to oxygen in the air to cause contamination of the base plate by the half-cured resin or deposition of the half-cured adherent residual resin to adversely affect the dimensional precision of the mold.

SUMMARY OF THE INVENTION

It is an object of this invention to solve these problems of the prior art and to provide an optical disc base plate which is substantially free of optical anisotropy and defects, has high precision (less sensitive to moisture and heat) and can be manufactured at low cost, and a process for producing such base plate.

According to the invention there is provided an optical disc base plate made of a light-cured resin composition comprising:

(i) a compound (1) having 4 or more acryl or methacryl groups in one molecule and a viscosity of 3,000 cps or less at 25° C., (ii) a compound (2) represented by the formula:

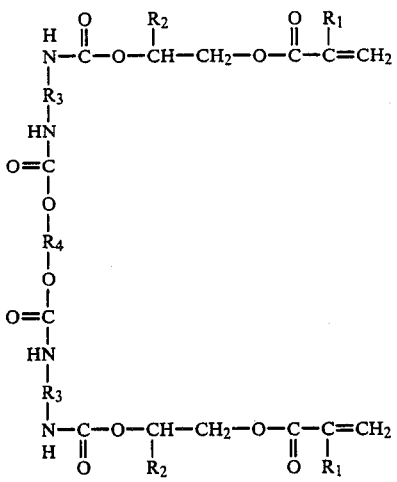

wherein $R_1$ is —H or —$CH_3$; $R_2$ is —H, an alkyl group having 1 to 5 carbon atoms, or

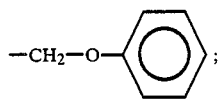

$R_3$ is a hydrocarbon group having 6 to 16 carbon atoms; and $R_4$ is a hydrocarbon group having 2 to 100 carbon atoms, (iii) a compound (3) of formula:

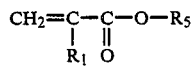

wherein $R_1$ is as defined above; and $R_5$ is a hydrocarbon group having 6 to 16 carbon atoms, and (iv) a photopolymerization initiator in an amount of 0.5 to 5 parts by weight per 100 parts by weight of the total of the compounds (1), (2) and (3), and the compounds (1), (2) and (3) being used in amounts falling in the area defined b lines A-B-C-D-E-A in the triangular diagram of FIG. 1, wherein individual points A, B, C, D and E have the following values in percent by weight:

|   | Compound (1) | Compound (2) | Compound (3) |
|---|---|---|---|
| A | 50 | 45 | 5 |
| B | 5 | 90 | 5 |
| C | 5 | 45 | 50 |
| D | 30 | 20 | 50 |
| E | 50 | 20 | 30 |

The present invention further provides a process for producing an optical disc base plate, which comprises placing a stamper having an information pattern and a light-transmittable plate in opposed relation to each other so that a vacancy is formed therebetween, dividing said vacancy into a main space and a resin reservoiring space therearound by positioning a notching ring in such a way as to form a small clearance at a part of said vacancy, casting a light-curable resin into the whole of said main space and a part of said resin reservoiring space, curing said light-curable resin by irradiation of energy from an external energy source, or first curing the light-curable resin in the main space alone by irradiating it with energy beams from an external energy source through a mask placed between said light-curable resin and said energy source and then curing the light-curable resin in the resin reservoiring space, and thereafter detaching said stamper and light-transmittable plate from the cured product of said resin in the main space while also removing the cured resin in the resin reservoiring space. In this process, an even better effect can be obtained when the above-said light-curable resin is used. Also, in the above process, the resin inlet is preferably moved into and across the main space while casting the resin into said space.

DESCRIPTION OF THE PREFERRED EMBODIMENTS

Figure 1:
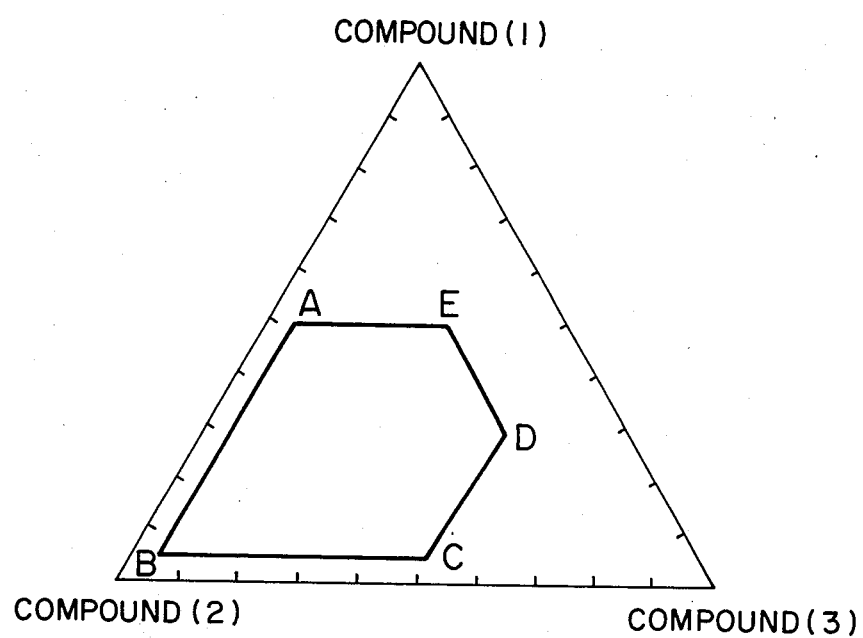
FIG. 1 is a triangular diagram showing the ratios of the compounds (1), (2) and (3) in a light-curable resin composition according to this invention.

The compound (1) specified above is used in this invention for affording a proper viscosity for molding of the light- or radiation-curable resin composition according to this invention. Said compound (1) is also useful for increasing the thermal deformation temperature of the cured product to improve its heat resistance and, in addition, for raising the modulus of elasticity for making the cured product harder to provide the desired level of surface hardness. The amount of said compound (1) in the light-curable resin composition comprising said four compounds (1)–(4) is preferably in the range from 5 to 50% by weight. If the amount of said compound (1) is less than 5% by weight, said effect of the compound is not provided to a satisfactory degree. If the amount of said compound (1) exceeds 50% by weight, the cured product of said light-curable resin composition proves to be poor in mechanical strength or too great in optical distortion.

Examples of said compound (1) are pentaerythritol tetraacrylate, pentaerythritol tetramethacrylate, dipentaerythritol hexaacrylate, dipentaerythritol hexamethacrylate, and hexaacrylates or hexamethacrylates of dipentaerythritol derivatives. The compound (2) is used for securing the desired mechanical strength and moisture resistance of the cured product of said light-curable resin composition according to this invention. The compound (2) is represented by the formula:

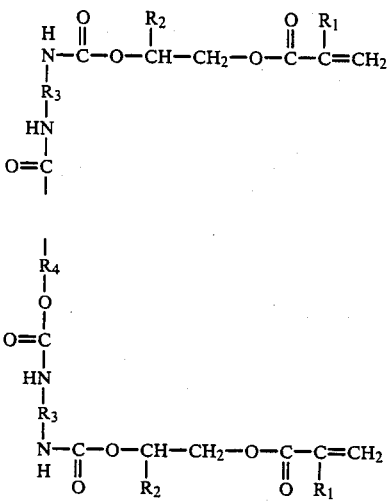

wherein $R_1$ is —H or —CH$_3$; $R_2$ is —H, an alkyl group having 1 to 5 carbon atoms, or

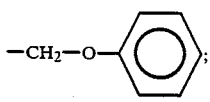

$R_3$ is a hydrocarbon group having 6 to 16 carbon atoms such as

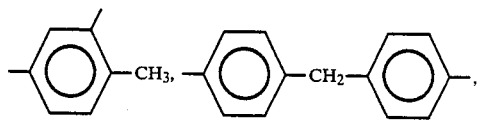

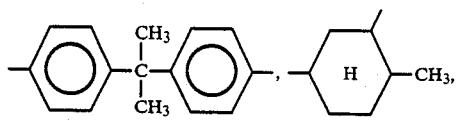

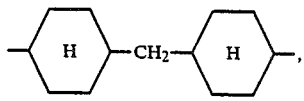

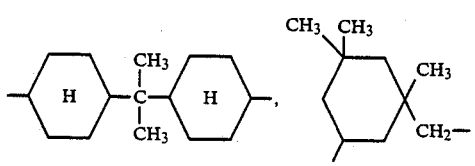

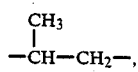

$R_4$ is a hydrocarbon group having 2 to 100 carbon atoms such as —CH$_2$CH$_2$—, —CH$_2$—CH$_2$—CH$_2$—, $$-\overset{CH_3}{\underset{|}{CH}}-CH_2-,$$

—(CH$_2$)$_n$— (n=4–14),

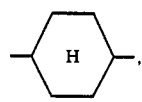

polybutadiene

The amount of the compound (2) in the resin composition comprising said compounds (1)–(4) is preferably in the range from 20 90% by weight. Below 20% by weight, said compound is unable to produce said effect to a satisfactory degree. Above 90% by weight, said compound deteriorates heat resistance and other properties of the cured product of said resin composition.

The compound (2) can be synthesized, for example, by reacting 2 moles of a diisocyanate with 1 mole of a diol and further reacting 2 moles of a mono hydroxylated acrylate (or methacrylate) with the remaining isocyanate groups. These compounds can be reacted in the form as they are, but in some cases, they may be reacted in an organic solvent, such as toluene or xylene, which is inert to the isocyanates. Also, a tin type catalyst such as di-n-butyltin dilaurate may be used as a reaction accelerator. It is also expedient to maintain the temperature of the reaction system at 50°-70° C.

Examples of the diols usable for said reaction include ethylene glycol, propylene glycol, 1,4-butanediol, 1,5-pentanediol, 1,6-hexanediol, 1,10-decanediol, 1,14-tetradecanediol, 1,4-cyclohexyldimethanol, and hydrogenated butadienediol. Among them, 1,6-hexanediol, 1,10-decanediol and 1,14-tetradecanediol are more preferable.

Examples of the diisocyanates usable for the above reaction are 2,4-tolylene diisocyanate, 4,4'-diphenylmethane diisocyanate, 2,2'-diphenylpropane-4,4'-diisocyanate, 1-methylcyclohexane-2,4-diisocyanate, methylenebis(4-cyclohexyl isocyanate), 2,2'-propylenebis(4-cyclohexyl isocyanate), isophorone diisocyanate, 1,6-hexamethylene diisocyanate, and 1,16-hexadecamethylene diisocyanate. Among them, 4,4'-diphenylmethane diisocyanate, 2,2'-diphenylpropane-4,4'-diisocyanate, methylenebis(4-cyclohexyl isocyanate), 2,2'-propylenebis(4-cyclohexyl isocyanate), and isophorone diisocyanate are more preferable.

Examples of the monohydroxylated acrylates (or methacrylates) used for said reaction are 2-hydroxyethyl acrylate (or methacrylate), 2-hydroxypropyl acrylate (or methacrylate), 2-hydroxybutyl acrylate (or methacrylate), 2-hydroxypentyl acrylate (or methacrylate), and 2-hydroxy-3-phenoxypropyl acrylate (or methacrylate).

Among them, 2-hydroxyethyl acrylate (or methacrylate), 2-hydroxypropyl acrylate (or methacrylate), 2-hydroxybutyl acrylate (or methacrylate), and 2-hydroxy-3-phenoxypropyl acrylate (or methacrylate) are more preferable.

Useful examples of the compound (2) for the resin composition of this invention are as follows:

a reaction product of 1 mole of 1,6-hexanediol and 2 moles of isophorone diisocyanate with addition of 2 moles of 2-hydroxyethyl acrylate (or methacrylate), a reaction product of 1 mole of 1,10-decanediol and 2 moles of isophorone diisocyanate with addition of 2 moles of 2-hydroxyethyl acrylate (or methacrylate), a reaction product of 1 mole of 1,14-tetradecanediol and 2 moles of isophorone diisocyanate with addition of 2 moles of 2-hydroxyethyl acrylate (or methacrylate), a reaction product of 1 mole of 1,4-cyclohexyldimethanol and 2 moles of isophorone diisocyanate with addition of 2 moles of 2-hydroxyethyl acrylate (or methacrylate), a reaction product of 1 mole of 1,6-hexanediol and 2 moles of methylenebis(4-cyclohexyl isocyanate) with addition of 2 moles of 2-hydroxypropyl acrylate (or methacrylate), a reaction product of 1 mole of 1,4-cyclohexyldimethanol and 2 moles of 1-methylcyclohexane-2,4-diisocyanate with addition of 2 moles of 2-hydroxybutyl acrylate (or methacrylate), a reactoon product of 1 mole of 1,10-decanediol and 2 moles of 2,2'-propylenebis(4-cyclohexyl isocyanate) with addition of 2 moles of 2-hydroxy-3-phenoxypropyl acrylate (or methacrylate), and a reaction product of 1 mole of 1,10-decanediol and 2 moles of isophorone diisocyanate with addition of 2 moles of 2-hydroxybutyl acrylate (or methacrylate).

Among them, the reaction product of 1 mole of 1,10-decanediol and 2 moles of isophorone diisocyanate with addition of 2 moles of 2-hydroxyethyl acrylate (or methacrylate) and the reaction product of 1 mole of 1,14-tetradecanediol and 2 moles of isophorone diisocyanate with addition of 2 moles of 2-hydroxyethyl acrylate (or methacrylate) are particularly more preferable.

The compound (3) plays the role of reducing optical strain and hygroscopicity of the cured product of the light-curable resin composition according to this invention.

The compound (3) is represented by the formula:

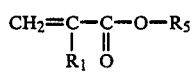

wherein $R_1$ is as defined above; and $R_5$ is a hydrocarbon group having 6 to 16 carbon atoms such as a cyclohexyl group, a bornyl group, an isobornyl group, a dicyclopentenyl group, a tricyclodecanyl group, and a straight-chain or branched alkyl group having 6 to 16 carbon atoms. This compound (3) is preferably used in an amount of 5 to 50% by weight based on the total weight of the resin composition. When the amount of the compound (3) is less than 5% by weight, said effect of this compound is not provided to a satisfactory degree. On the other hand, when the amount of the compound (3) is greater than 50% by weight, the resulting cured product tends to lower in mechanical strength.

Examples of said compound (3) are cyclohexyl acrylate, cyclohexyl methacrylate, bornyl acrylate, bornyl methacrylate, isobornyl acrylate, isobornyl methacrylate, dicyclopentenyl acrylate, dicyclopentenyl methacrylate, tricyclodecanyl acrylate, tricyclodecanyl methacrylate, n-hexyl acrylate, n-hexyl methacrylate, 2-ethylhexyl acrylate, 2-ethylhexyl methacrylate, n-decyl acrylate, n-decyl methacrylate, lauryl acrylate, lauryl methacrylate, tridecyl acrylate, and tridecyl methacrylate.

In the resin composition of this invention, the compound (4) acts for generating radicals on irradiation of light to induce radical polymerization of the acryl and methacryl groups in said resin composition. The compound (4) is preferably used in an amount of 0.5 to 5% by weight based on the total weight of the composition. When the amount of the compound (4) is less than 0.5% by weight, light curing of the resin becomes insufficient, while when the amount of this compound is over 5% by weight, the cured product of said resin composition is lowered in mechanical strength.

Examples of the compound (4) are benzils; benzoins such as benzoin, benzoin ethyl ether, benzoin isopropyl ether, benzoin isobutyl ether, etc.; benzophenones such as benzophenone, 4-methoxybenzophenone, etc.; acetophenones such as acetophenone, 2,2-diethoxyacetophenone, etc.; thioxanthones such as 2-chlorothixanthone, 2-methylthioxanthone, etc,; anthraquinones such as 2-ethylanthraquinone, 2-methylanthraquinone, etc.; benzil methyl ketal, 1-hydroxycyclohexylphenyl ketone, 2-hydroxy-2-methyl-1-phenylpropane-1-one, and 1-(4-isopropylphenyl)-2-hydroxy-2-methylpropane-1-one.

These compounds can be used individually or in combination.

By using said light-curable resin composition, there can be produced an optical disc base plate and an optical disc in the manner described in the following Examples.

EXAMPLE 1

A light-curable resin composition was prepared by mixing the compounds (1)–(4) in amounts (parts by weight) shown in Table 1.

Figure 2:
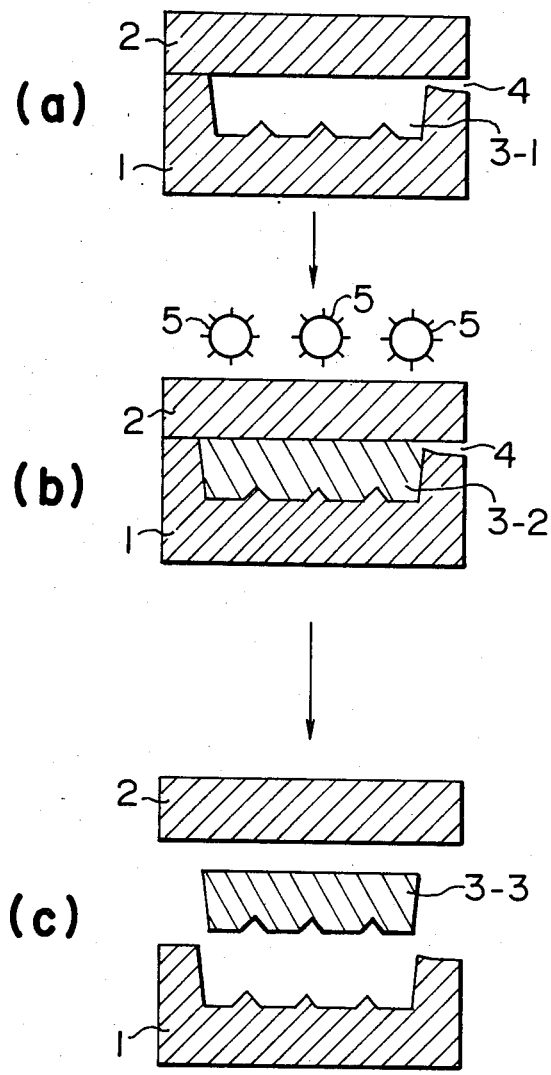
FIGS. 2(a) to (c) show a process for producing an optical disc in accordance with this invention.

There was also prepared a nickel-made stamper 1 having grooves (0.09 μm deep and 0.40 μm wide) and pits (0.16 μm deep and 0.60 μm wide) and an outer diameter of 300 mm, as shown in FIG. 2(a).

A circular glass plate 2 having an outer diameter of 300 mm (10 mm thick), baked with a dimethylsilicone releasing agent on the surface, was combined with said stamper 1 to form a 1.3 mm space 3-1 as shown in FIG. 2(a), and then said light-curable resin composition 3-2 was cast into said space through an inlet 4 under vacuum as shown in FIG. 2(b).

This assembly was irradiated via the glass plate 2 with ultraviolet light of wavelength of 320–400 nm from a high pressure mercury lamp 5 with an intensity of 150 mW/cm² for 40 seconds to cure the resin composition.

Then the cured resin composition was taken out from the stamper 1 and glass plate 2 to obtain an approximately 1.2 mm thick transparent plate 3-3 having grooves and pits as shown in FIG. 2(c).

The properties of the thus obtained transparent plate were determined as follows:

(1) Curing characteristics

The state of curing was judged by visual observation of the surface of the produced transparent plate.

(2) Retardation

Retardation of a single pass was measured at a wavelength of 830 nm.

(3) Heat resistance

A flat plate specimen of 45 mm in length and 5 mm in width was cut out from said transparent plate, and this specimen, fixed at one end and given a load of 10 g at the other end, was heated at a heating rate of 10° C./min to determine the temperature at which the deformation begins to take place.

(4) Tensile strength

A dumbell was prepared from said transparent plate and its tensile strength was measured according to JIS K-6745.

Transparent plates having grooves and pits are desirable when they are good in curing characteristics and have a retardation of 10 nm or less, a heat resistance of 70° C. or higher and a tensile strength of 500 kg/cm² or more. When the transparent plate fails to meet these target values, the optical disc recording medium made by using such transparent plate (substrate) tends to have troubles in use, such as increased signal noise, warping in a high-temperature atmosphere and breakdown in operation.

As seen from Table 1, none of the transparent plates made of the light-curable resin compositions of Comparison Run Nos. 1–12 meets the target velues of all items (curing characteristics, retardation, heat resistance and tensile strength), while the transparent plates made of the resin compositions of Run Nos. 1–10 of the present invention meet all of the target values. In Tables 1 and 2, DPCA 30 and DPCA 60 are represented by the formula:

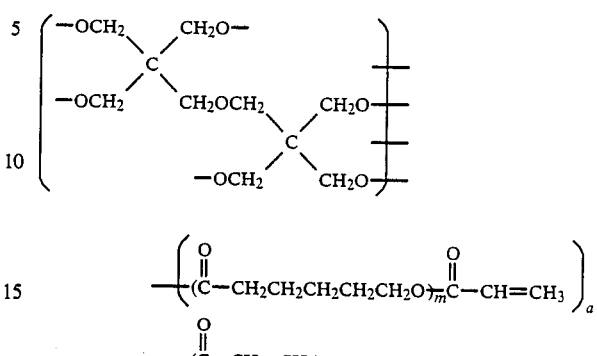

wherein for DPCA 30, m=1, a=3 and b=3; and for DPCA 60, m=1, a=6 and b=0.

TABLE 1

| Composition and properties | Comparison Run No. |  |  |  |  |  |  |  |
|---|---|---|---|---|---|---|---|---|
|  | 1 | 2 | 3 | 4 | 5 | 6 | 7 | 8 |
| Resin composition | | | | | | | | |
| Compound (1) Dipentaerythritol derivative hexaacrylate (DPCA 30, Nippon Kayaku) | 100 | 80 | 50 | 30 | — | — | — | — |
| Compound (2) [structure shown] | — | 20 | 50 | 70 | 100 | 70 | 50 | 20 |
| Compound (3) Isobornyl methacrylate [structure shown] | — | — | — | — | — | 30 | 50 | 80 |
| Compound (4) 1-(4-Isopropylphenyl)-2-hydroxy-2-methylpropane-1-one | 2 | 2 | 2 | 2 | 2 | 2 | 2 | 2 |
| Properties | | | | | | | | |
| Curing characteristics | Good | Good | Good | Good | Good | Good | Good | Poor |
| Retardation (nm) (830 nm, 1 mm thick) | 100 | 60 | 35 | 25 | 3 | 2 | 1 | — |
| Heat resistance (°C.) | >150 | >150 | 100 | 90 | 50 | 45 | 45 | — |
| Tensile strength (kg/cm²) | 140 | 210 | 330 | 550 | 800 | 600 | 400 | — |

|  | Comparison Run No. |  |  |  | Present invention |  |  |
|---|---|---|---|---|---|---|---|
|  | 9 | 10 | 11 | 12 | 1 | 2 | 3 |
| Resin composition | | | | | | | |
| Compound (1) Dipentaerythritol derivative hexaacrylate (DPCA 30, Nippon Kayaku) | — | 50 | 70 | 10 | 50 | 5 | 5 |
| Compound (2) | — | — | 20 | 20 | 45 | 90 | 45 |

TABLE 1-continued

Composition and properties $$\left[ CH_2=\overset{H}{\underset{O}{C}}CO(CH_2)_2O\overset{H}{\underset{O}{C}}N-\text{(trimethylcyclohexyl)}-CH_2-\overset{H}{N}\overset{}{\underset{O}{C}}O\right]_2-(CH_2)_{10}$$

| | | | | | | | |
|---|---|---|---|---|---|---|---|
| Compound (3)<br>Isobornyl methacrylate | 100 | 50 | 10 | 70 | 5 | 5 | 50 |

$$CH_2=\underset{CH_3}{\overset{CH_3}{C}}-\underset{O}{\overset{}{C}}-\text{(trimethylbicycloheptyl)}$$

| | | | | | | | |
|---|---|---|---|---|---|---|---|
| Compound (4)<br>1-(4-Isopropylphenyl)-2-hydroxy-2-methylpropane-1-one | 2 | 2 | 2 | 2 | 2 | 2 | 2 |
| Properties | | | | | | | |
| Curing characteristics | Poor | Good | Poor | Poor | Good | Good | Good |
| Retardation (nm) (830 nm, 1 mm thick) | — | 2 | 40 | — | 10 | 4 | 1 |
| Heat resistance (°C.) | — | 100 | >150 | — | 130 | 75 | 70 |
| Tensile strength (kg/cm$^2$) | — | 100 | 110 | — | 520 | 750 | 550 |

| | Example Present invention Run No. | | | | | | |
|---|---|---|---|---|---|---|---|
| | 4 | 5 | 6 | 7 | 8 | 9 | 10 |
| Resin composition | | | | | | | |
| Compound (1)<br>Dipentaerythritol derivative hexaacrylate<br>(DPCA 30, Nippon Kayaku) | 30 | 50 | 15 | 40 | 25 | 10 | 35 |
| Compound (2) | 20 | 20 | 70 | 50 | 50 | 50 | 30 |

$$\left[ CH_2=\overset{H}{\underset{O}{C}}CO(CH_2)_2O\overset{H}{\underset{O}{C}}N-\text{(trimethylcyclohexyl)}-CH_2-\overset{H}{N}\overset{}{\underset{O}{C}}O\right]_2-(CH_2)_{10}$$

| | | | | | | | |
|---|---|---|---|---|---|---|---|
| Compound (3)<br>Isobornyl methacrylate | 50 | 30 | 15 | 10 | 25 | 40 | 35 |

$$CH_2=\underset{CH_3}{\overset{CH_3}{C}}-\underset{O}{\overset{}{C}}-\text{(trimethylbicycloheptyl)}$$

| | | | | | | | |
|---|---|---|---|---|---|---|---|
| Compound (4)<br>1-(4-Isopropylphenyl)-2-hydroxy-2-methylpropane-1-one | 2 | 2 | 2 | 2 | 2 | 2 | 2 |
| Properties | | | | | | | |
| Curing characteristics | Good | Good | Good | Good | Good | Good | Good |
| Retardation (nm) (830 nm, 1 mm thick) | 1 | 3 | 5 | 9 | 2 | 2 | 2 |
| Heat resistance (°C.) | 90 | 120 | 100 | 140 | 140 | 90 | 120 |
| Tensile strength (kg/cm$^2$) | 570 | 580 | 740 | 600 | 650 | 600 | 570 |

EXAMPLE 2

Light-curable resin compositions were prepared by combining and mixing the component materials as shown in Table 2. By using these compositions, transparent plates having grooves and pits were formed in the same way as in Example 1 and their properties were evaluated.

As seen from Table 2, the transparent plates of comparative Run Nos. 13 and 14 using the ordinary component materials came short of the target levels in retardation, heat resistance and tensile strength, while the products of Run Nos. 11–16 of this invention all showed the property values above the targets in all the items.

TABLE 2

| Composition and properties | | Comparison | | This invention Run No. | | | | | |
|---|---|---|---|---|---|---|---|---|---|
| | | 13 | 14 | 11 | 12 | 13 | 14 | 15 | 16 |
| Composition | Ordinary compound $\left[\begin{array}{c}CH_3\\ \underset{CH_3}{\overset{|}{C}}\\ \end{array}\underset{}{\underset{}{\bigcirc}}-\underset{}{\underset{}{\bigcirc}}-OCH_2CHCH_2O\right]_2 \overset{O}{\underset{}{C}}CH=CH_2$ | 100 | — | — | — | — | — | — | — |
| | $CH_2=CHCO-CH_2-\overset{CH_3}{\underset{CH_3}{\overset{|}{C}}}-\overset{CH_2-O-CH_2}{\underset{CH_2-O-CH_2}{\overset{|}{C}}}\overset{CH_2-O-C-CH=CH_2}{\underset{CH_2-CH_3}{}}$ | — | 100 | — | — | — | — | — | — |
| | Dipentaerythritol hexamethacrylate | — | — | 20 | — | — | — | — | — |
| | Dipentaerythritol derivative hexamethacrylate (DPCA 60, Nippon Kayaku) | — | — | 50 | 30 | 30 | 30 | 30 | 30 |
| Compound (1) | (structure with cyclohexyl-NH-CO groups) | — | — | — | 50 | — | — | — | 50 |
| Compound (2) | (structure with cyclohexyl groups and methyl branch) | — | — | — | — | 50 | — | — | — |
| | (structure with cyclohexyl-C(CH_3)_2 bisphenol-type) | — | — | — | — | — | 50 | — | — |
| | (structure with cyclohexyl-C(CH_3)_2 and longer chain) | — | — | — | — | — | — | 50 | — |

TABLE 2-continued

| Composition and properties | | Comparison | | | Example (Run No.) | | | | | |
|---|---|---|---|---|---|---|---|---|---|---|
| | | 13 | 14 | 11 | 12 | 13 | 14 | 15 | 16 |
| Compound (3) | $$\left[ \begin{array}{c} CH_3 \quad C_2H_5 \quad O \quad H \\ CH_2=C-CO-CH_2-C-O-C-N \\ \parallel \qquad \qquad H \qquad \parallel \\ O \qquad \qquad \qquad O \end{array} \middle\langle \begin{array}{c} CH_3 \; CH_3 \\ \\ CH_3 \end{array} \right\rangle CH_2-N-C-O-[(CH_2)_{10}-O]_2$$ | — | — | — | — | — | — | 50 | — |
| | Bornyl methacrylate | — | — | 30 | 20 | 20 | 20 | 20 | 20 |
| | Tricyclodecanyl acrylate | — | — | — | — | — | — | — | 20 |
| Compound (4) | 1-Hydroxycyclohexyl phenyl ketone | 2 | 2 | 2 | 2 | 2 | 2 | 2 | 2 |
| Properties | Curing characteristics | Good | Good | Good | Good | Good | Good | Good | Good |
| | Retardation (nm) (830 mm, 1 mm - thick) | 20 | 70 | 4 | 120 | 125 | 120 | 120 | 120 |
| | Heat resistance (°C.) | 50 | 80 | 120 | 120 | 125 | 120 | 120 | 122 |
| | Tensile strength (kg/cm²) | 470 | 220 | 600 | 630 | 630 | 650 | 650 | 600 |

APPLICATION EXAMPLE 1

A 30 nm thick Te-Sn phase transformation type recording film was formed by vacuum deposition on the surface of each of the transparent plates having grooves and pits of Run Nos. 1–10 of this invention shown in Table 1 and Run Nos. 11–16 of this invention shown in Table 2 described in Examples 1 and 2, respectively, and then a 10 nm thick $SiO_2$ film was further formed thereon as a protective coat by vacuum deposition. Then a 1 mm thick polycarbonate plate was adhered thereto by using an epoxy resin to form an optical disc recording medium.

Recording and readout characteristics of the thus obtained optical recording media were evaluated by applying a semiconductor laser light of 830 nm from the side of the transparent plate according to this invention. Normal operation of these recording media was ascertained.

EXAMPLE 3

Figure 3:
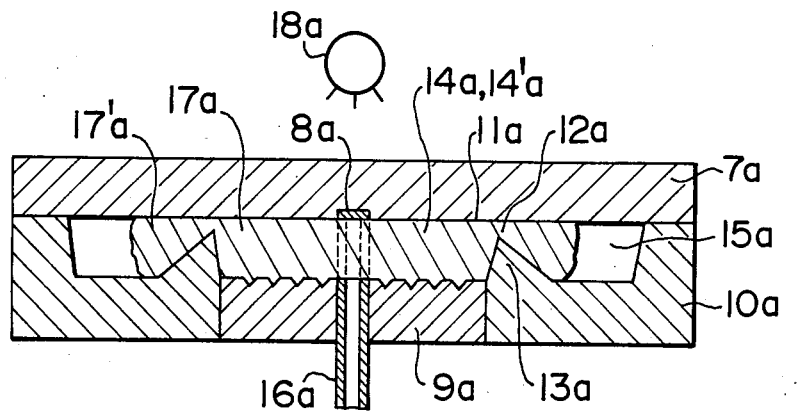
FIG. 3 is an illustration of the optical disc base plate producing process according to Example 3 of this invention.

FIG. 3 illustrates a process for producing an optical disc base plate according to one embodiment of this invention.

In the drawing, 7a indicates a flat reinforced glass plate measuring 1 mm in thickness and 200 mm in outer diameter. A black mask 8a is secured to a central part on the underside of said plate 7a. A stamper 9a made of Ni and having an outer dimeter of 130 mm is disposed parallel and opposing to said plate 7a so that a distance of 1.3 mm is held therebetween. Said stamper 9a is securely held by an outer peripheral ring 10a having an inner diameter of 130 mm and L-shaped in section. Said ring 10a has a height of 1 mm and the top end face thereof abuts against the outer peripheral part of the underside of said flat plate 7a, thus forming a space 11a between said flat plate 7a and stamper 9a. At the upper end of the inner periphery of said ring 10a is provided a notching ring 13a having a triangular sectional shape, which projects into said space 11a so that a small clearance 12a is formed between the apex of said triangular notching ring 13a and the underside of said flat plate 7a. It will be seen that the space 11a is divided into a main space 14a and a resin reservoiring space 15a by said notching ring 13a. The main space 14a defines a mold 14a'. 16a is a tubular casting nozzle. It is loosely fitted in the central part of said stamper 9a so as to be movable vertically by a moving mechanism not shown. When its top end face becomes flush with the upper surface of the stamper 9a, it casts, while moving upwardly, an acrylic or methacrylic light-curable resin 17a (comprising 30% by weight of dipentaerythritol hexaacrylate, 40% by weight of the reaction product of 1 mole of isophorone diisocyanate and 2 moles of 2-hydroxyethyl acrylate, 29% by weight of isobornyl methacrylate, and 1% by weight of 1-hydroxycyclohexyl phenyl ketone) (hereinafter referred to as the first light-curable resin) into the mold 14a' from a supply source not shown. Casting of the resin is stopped when said first light-curable resin 17a fills up the mold 14a' and further passes into the resin reservoiring space 15a through the small clearance 12a between the notching ring 13a and the flat plate 7a to fill approximately half of said space 15a and the top end of said casting nozzle 16a abuts against the mask 8a. A light source 18a is disposed at a position upward of said flat plate 7a. When the casting of light-curable resin into said mold 14a' and resin reservoiring space 15a has been completed, the light-curable resin 17a, 17a' in said both sections are irradiated via said flat plate 7a with the energy beams (not shown) from said light source 18a.

Thus, in accordance with said process of this invention, when the casting nozzle 16a reaches the positions where its top end face is flush with the upper surface of the stamper 9a, it begins to cast the first light-curable resin 17a from a supply source into the mold 14a' while keeping on with its upward movement.

After filling the mold 14a', said first light-curable resin 17a further passes into the resin reservoiring space 15 through the small clearance 12a between the notching ring 13a and the flat plate 7a to fill about half of said space 15a whilst the top end of said casting nozzle 16a comes into abutment against the mask 8a as shown by the chain lines in the drawing, whereupon the casting of first light-curable resin 17a is finished.

Then the first light-curable resin 17a in the mold 14a' and the first light-curable resin 17a' in the resin reservoiring space 15a are irradiated via the flat plate 7a with energy beams from the light source 18a and thereby cured.

After the first light-curable resin 17a, 17a' has been cured, the flat plate 7a, stamper 9a and outer peripheral ring 10a are detached from the cured resin 17a in the mold 14a' while the cured resin 17a' in the resin reservoiring space 15a is removed, thus obtaining an optical disc base plate having an information pattern from the cured product of the first light-curable resin 17a in the mold 14a'.

The optical disc base plate obtained in the manner described above had an outer diameter of $130\pm0.1$ mm, a warpage of less than 0.1 mm, a thickness variation of $\pm0.05$ mm, and an optical retardation of less than 5 nm against light of 830 nm wavelength (double pass). It was also free of voids and sinks and appliable to practical use. Contamination due to the imperfectly cured resin was seen in the cured resin 17a' in the resin reservoiring space 15a alone. Especial cleaning of the mold 14a' is unnecessary after the operation as the next run of molding in the mold 14a' can be normally carried out by merely removing the resin 17a' in the resin reservoiring space 15a.

EXAMPLE 4

Figure 4:
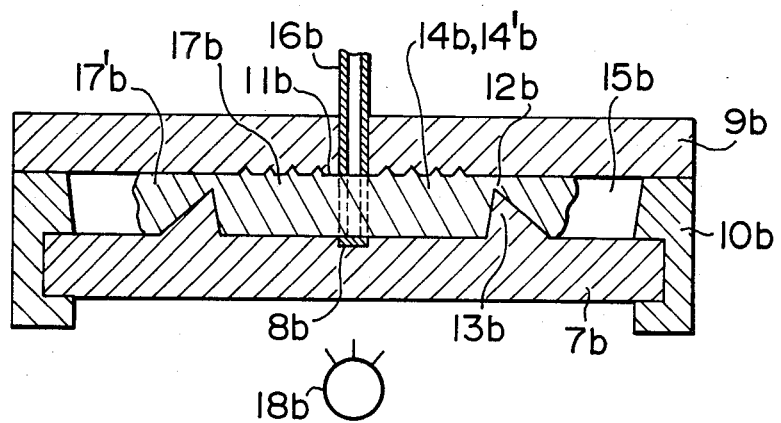
FIG. 4 is an illustration of the optical disc base plate producing process according to Example 4 of this invention.

FIG. 4 is an illustration showing the process for producing an optical disc base plate according to another embodiment of this invention.

In the illustration, 7b refers to a flat glass plate measuring 10 mm in thickness and 180 mm in outer diameter and having a black mask 8b securely fitted to a central part on the upperside thereof. 9b is a stamper made of an Ni plate with an outer diameter of 200 mm and disposed parallel to said flat plate 7b with a distance of 1.3 mm therefrom. 10b is an outer peripheral ring having its upper end abutted against the underside of said stamper 9b. Also, the outer peripheral portion of said flat plate 7b is securely fitted into and supported by the inner peripheral surface of said ring 10b in a way to maintain a distance of 1.3 mm from the stamper 9b, thereby forming a space 11b between said flat plate 7b and stamper 9b. A notching ring 13b, triangular in sectional shape, is secured to the upper face of said flat plate 7b so that a small clearance 12b is formed between the apex of said triangular ring 13a and the underside of said stamper 9b. It will be seen that said space 11b is divided into a main space 14b and a resin reservoiring space 15b by said notching ring 13b. The main space 14b defines a mold 14b'. A tubular casting nozzle 16b is loosely fitted through the central part of said stamper 9b so as to be movable vertically by a moving mechanism not shown. When said casting nozzle 16b reaches the position where its upper end is flush with the upper surface of said stamper 9b, said nozzle casts, while moving upwardly, an acrylic or methacrylic light-curable resin 17b (comprising 30% by weight of dipentaerythritol hexaacrylate, 40% by weight of the reaction product of 1 mole of 1,1'-methylene-bis(4-isocyanatocyclohexane) and 2 moles of 2-hydroxyethyl acrylate, 29% by weight of bornyl methacrylate and 1% by weight of 1-hydroxycyclohexyl phenyl ketone) (hereinafter referred to as the second light-curable resin) into the mold 14b' from a supply source (not shown). Casting of the resin is stopped when said second light-curable resin 17b has filled up the mold 14b' and further passed into the resin reservoiring space 15 through the small clearance 12b between the notching ring 13b and flat plate 7b to fill about half of said space 15b whilst the lower end of said casting nozzle 16b abuts against the mask 8b. A light source 18b is disposed at a position downward of said flat plate 7b. The light-curable resin 17b in the mold 14b' and the light-curable resin 17b' in the resin reservoiring space 15b are irradiated via the flat plate 7b with the energy beams (not shown) from said light source 18b.

In accordance with said process of this invention, when the upper end of the casting nozzle 16b reaches the position where its upper end is flush with the upper surface of the stamper 9b, the second light-curable resin 17b from a supply source is cast into the mold 14b' from said casting nozzle 16b as it keeps on moving downward.

After the mold 14b' has been filled with the second light-curable resin 17b, said resin is further forced into the resin reservoiring space 15b through the small clearance 12b between the notching ring 13b and the stamper 9b to fill about half of the space 15b, while the lower end of said casting nozzle 16b comes into abutment against the mask 8b, whereupon the casting of the second light-curable resin is completed.

Then the light-curable resin 17b in the mold 14b' and that 17b' in the resin reservoiring space 15 are cured via the flat plate 7b by irradiation of energy beams from the light source 18b.

After the light-curable resin in said both sections has been cured, the flat plate 7b, stamper 9b and outer peripheral ring 10b are removed from the cured resin in the mold 14b while the cured resin 17b' in the resin reservoiring space 15b is also eliminated to obtain an optical disc base plate having an information pattern.

The optical disc base plate obtained in the manner described above had an outer diameter of 130±0.1 mm, a warpage of less than 0.1 mm, a thickness variation of ±0.05 mm and an optical retardation of less than 5 mm against light of 830 nm wavelength (double pass). It was also free of voids and sinks and suited for practical use. Contamination by the imperfectly cured resin was seen in the cured resin 17b' in the resin reservoiring space 15b alone. It is, however, possible to carry out the next run of molding in the mold 14b' by merely removing the cured resin 17b' in the resin reservoiring space 15a, so that especial cleaning of the mold (cavity) 14b' is unnecessary.

EXAMPLE 5

Figure 5:
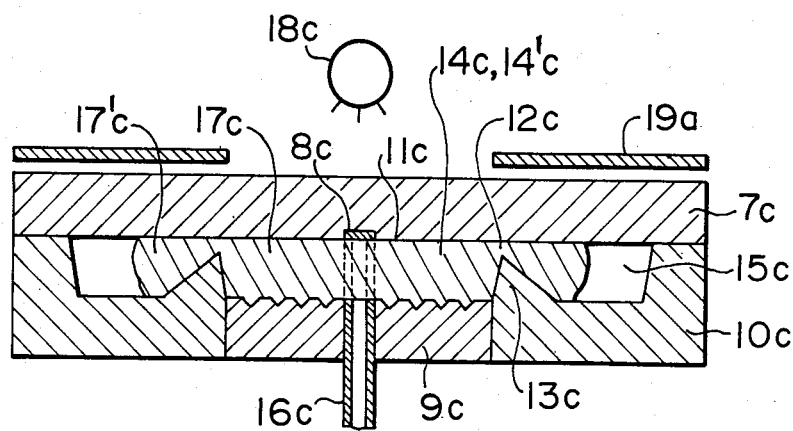
FIG. 5 is an illustration of the optical disc base plate producing process according to Example 5 of this invention.

FIG. 5 illustrates the process for producing an optical disc base plate in accordance with still another embodiment of the invention.

This embodiment is the same as the foregoing Example 3 in that a reinforced glass-made flat plate 7c of 1 mm in thickness and 250 mm in outer diameter and an Ni-made stamper 9c having an outer diameter of 200 mm are disposed parallel to each other with a distance of 1.3 mm therebetween, and an outer peripheral ring 10c having a height of 1 mm and an inner diameter of 200 mm and provided with a notching ring 13c is combined with said members so as to form a space 11c between said flat plate 7c and stamper 9c. said space 11c being divided by the notching ring 13c into a main space 14c and a resin reservoiring space 15c, said main space 14c forming a mold 14c', and that an casting nozzle 16c is loosely fitted through a central part of said stamper 9c so as to be movable vertically.

The difference of this embodiment from Example 3 is that a black mask 19a is disposed between said flat plate 7c and light source 18c for shielding the light-curable resin 17' in the resin reservoiring space 15c against irradiation of energy beams (not shown) from the light source 18c.

When an optical disc base plate having an information pattern was made according to the method of Example 3 by filling the mold 14c' with a light-curable resin 17, then further passing the resin into the resin reservoiring space 15c through the small clearance 12c between the notching ring 13c and flat plate 7c to fill about half of said space 15c, and then curing the resin 17 in the mold 14c' and the resin 17' in the resin reservoiring space 15c via the plate 7c by irradiation of energy beams from the light source 18c, a small clearance of vacuum was created between the cured resin and the main space 14c due to the cure shrinkage of the light-curable resin 17 in the mold 14', and this caused sinking at the part of the molded product which was in contact with the outer peripheral ring 10c.

In this embodiment, as mentioned above, a black mask 19a is disposed between the light source 18c and the flat plate 7c so that the light-curable resin 17 in the mold 14c' alone will be cured by energy beams from the light source 18c which are passed through the central opening of said mask 19a, thereby effecting curing of the light-curable resin 17 alone. In this case, if the resin 17 is shrunken on curing, the resin 17' in the resin reservoiring space 15c, which is not cured, is automatically supplied into the mold 14c' through the small clearance 12c between the notching ring 13c and the flat plate 7c by dint of the pressure difference between the mold 14c' and the resin reservoiring space 15c to thereby prevent the formation of the clearance in the mold 14c'.

After the resin 17 in the mold 14c' has been cured, said black mask 19 is removed and the resin 17' in the resin reservoiring space 15c is then cured by irradiating it with the energy beams from the light source 18c. In this way, it is possible to prevent sinking at the part of the produced optical disc base plate which contacts the outer peripheral ring 10c.

EXAMPLE 6

Figure 6:
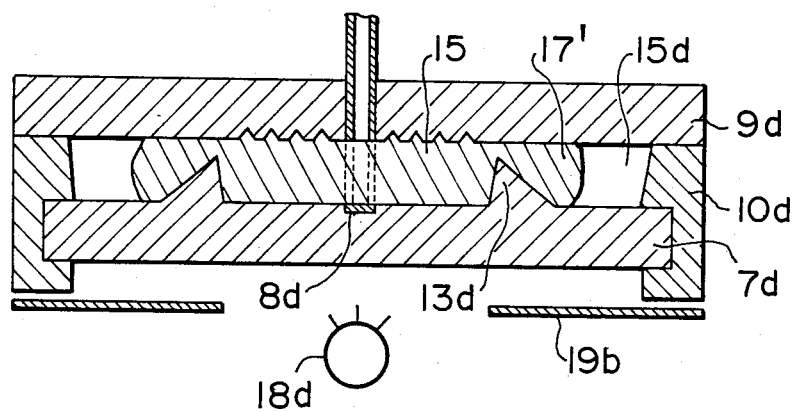
FIG. 6 is an illustration of the optical disc base plate producing process according to this invention.

FIG. 6 is an illustration of the process for producing an optical disc base plate according to yet another embodiment of this invention.

In this embodiment, as in Example 4, a glass-made flat plate 7d of 10 mm in thickness and 240 mm in outer diameter, provided with a glass-made notching ring 13d of 1 mm in height and 200 mm in inner diameter, is disposed in opposed parallel relation to an Ni-made stamper 9d, and they are secured in position by an outer peripheral ring 10d so that a distance of 1.3 mm is defined between said flat plate 7d and stamper 9d.

This embodiment differs from Example 4 in that a black mask 19b is disposed between said flat plate 7d and light source 18d for shielding the resin 17' in the resin reservoiring space 15d against irradiation of energy beams from the light source 18d for the same reason as stated in Example 5.

It is thereby possible to prevent sinking of the outer peripheral portion of the produced optical disc base plate as in Example 5 described above.

COMPARATIVE EXAMPLE 1

Figure 7:
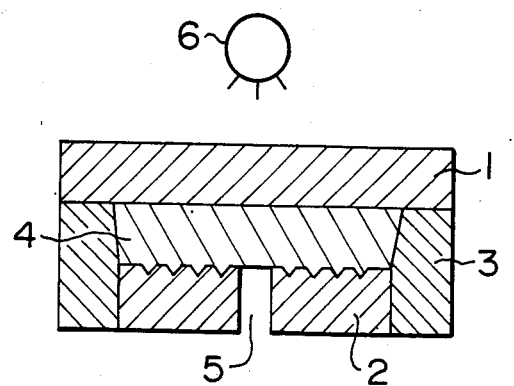
FIG. 7 is an illustration showing a conventional optical disc base plate producing process.

As illustrated in FIG. 7, a reinforced glassmade flat plate 1 of 1 mm in thickness and 150 mm in outer diameter and an Ni-made stamper 2 having an outer diameter of 130 mm were disposed in opposed parallel relation to each other, and an outer peripheral ring 3 was combined therewith so that a distance of 1.3 mm was held between said flat plate 1 and stamper 2. Then the same light-curable resin (the first light-curable resin) 17a as used in Example 3 was cast into the space 4 between said flat plate 1 and stamper 2 from an inlet 5 and cured by irradiation of energy beams from the light source 6, and then the flat plate 1 and the stamper 2 were removed from the cured product of said first light-curable resin 17a to obtain an optical disc base plate having an information pattern.

This base plate has suffered at its outer peripheral portion from extensive sinking resulting from cure shrinkage of the resin. Also, imperfect curing took place at the portion of the resin exposed to the air to cause contamination of the product over a wide area. Thus, this product could hardly serve for practical use.

Further, since the imperfectly cured half-solid resin contaminated the joint between the reinforced glass-made plate 1 and the outer peripheral ring 3, it was hardly possible to carry out the next run of molding without removing such contamination.

COMPARATIVE EXAMPLE 2

Figure 8:
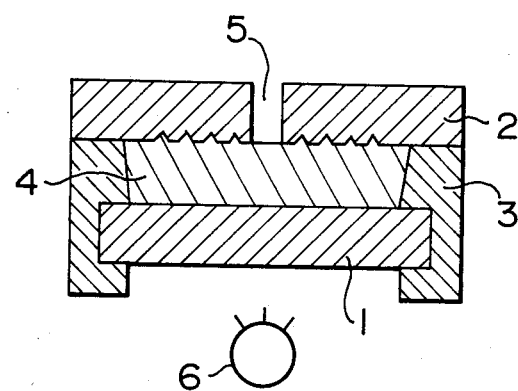
FIG. 8 is an illustration showing another conventional optical disc base plate producing process.

As illustrated in FIG. 8, a glass-made flat plate 1 of 10 mm in thickness and 140 mm in outer diameter and an Ni-made stamper 2 were disposed parallel to each pheral ring 3 having an inner diameter of 130 mm so as to hold a distance of 1.3 mm between said flat plate 1 and stamper 2. Then the same light-curable resin (the second light-curable resin) 17b as used in Example 4 was cast into the space 4 between said flat plate 1 and stamper 2 from an inlet 5 and cured by irradiation of energy beams from the light source 6, and then said flat plate stampe 2 were removed from the cured product of said second light-curable resin 17 to obtain a patterned base plate for optical disc.

The outer peripheral portion of this base plate was subject to extensive sinking due to cure shrinkage of the resin. Also, imperfect curing of the resin portion exposed to the air caused contamination of the product over a wide area. Thus, the product was hardly capable of practical use.

Further, since the joint between the reinforced glass-made flat plate 1 and the outer peripheral ring 3 was contaminated by the imperfectly cured half-solid resin, it was hardly possible to carry out the next run of molding without removing such contamination.

As described above, the present invention enables high-speed and low-cost production of an optical disc base plate which is minimized in optical strain and has high heat resistance, mechanical strength and precision as well as a high degree of transparency.

What is claimed is:

1. An optical disc base plate made from a casting of light-cured resin composition consisting essentially of:

(i) a compound (1) represented by the formula:

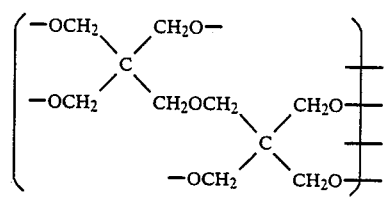

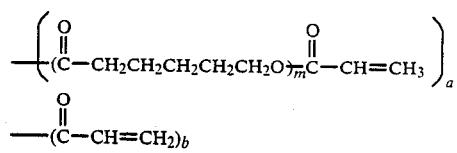

wherein m=1, a=3 and b=3; or wherein m=1, a=6 and b=0, (ii) A compound (2) represented by the formula:

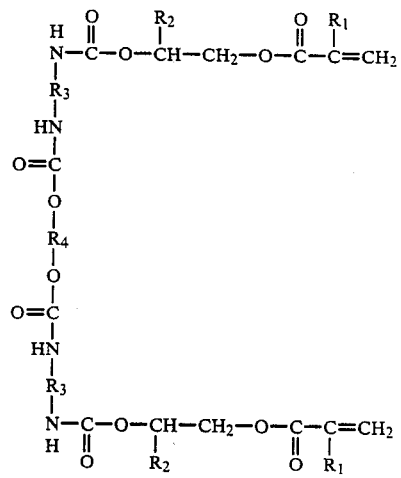

wherein $R_1$ is —H or —$CH_3$; $R_2$ is —H, an alkyl group having 1 to 5 carbon atoms, or

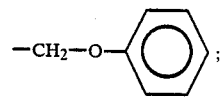

$R_3$ is a hydrocarbon group having 6 to 16 carbon atoms; and $R_4$ is a hydrocarbon group having 2 to 100 carbon atoms, (iii) a compound (3) of the formula:

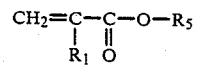

wherein $R_1$ is as defined above; and $R_5$ is a hydrocarbon group having 6 to 16 carbon atoms, and (iv) a photopolymerization initiator in an amount of 0.5 to 5 parts by weight per 100 parts by weight of the total of the compounds (1), (2) and (3) and the compounds (1), (2) and (3) being used in amounts falling in the area defined by the lines A-B-C-D-E-A in the triangular diagram of FIG. 1, wherein individual points A, B, C, D and E have the following values in percent by weight:

|   | Compound (1) | Compound (2) | Compound (3) |
|---|---|---|---|
| A | 50 | 45 | 5 |
| B | 5 | 90 | 5 |
| C | 5 | 45 | 50 |
| D | 30 | 20 | 50 |
| E | 50 | 20 | 30 |

2. An optical disc base plate according to claim 1 wherein the compound (2) has as $R_3$

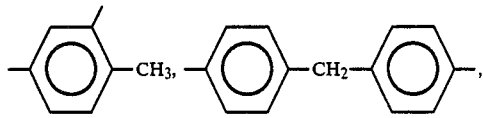

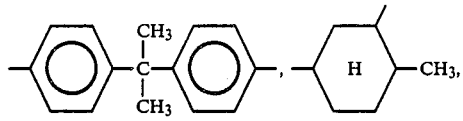

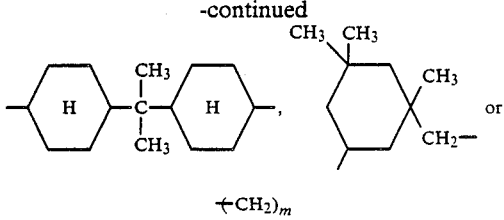

(m=6 to 16).

3. An optical disc base plate according to claim 1 wherein the compound (2) has as $R_4$ —$CH_2CH_2$—, —$CH_2$—$CH_2$—$CH_2$—,

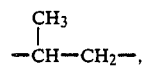

—$CH_2)_n$ (n=4 to 14),

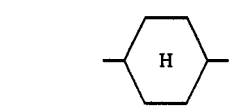

or polybutadiene moiety.

4. An optical disc base plate according to claim 1, wherein the compound (3) has as $R_5$ a cyclohexyl group, a bornyl group, an isobornyl group, a dicyclopentenyl group, a tricyclodecanyl group, or a straight-chain or branched alkyl group having 6 to 16 carbon atoms.

5. An optical disc base plate according to claim 1, wherein said base plate is transparent.

6. An optical disc plate according to claim 1 wherein $R_5$ is an alicyclic hydrocarbon selected from the group consisting of bornyl group, isobornyl, group, dicyclopentenyl group and tricyclodecanyl group.

7. An optical disc plate according to claim 1, wherein compound (2) is a compound of one of the four formulae:

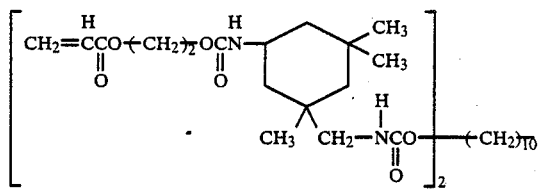

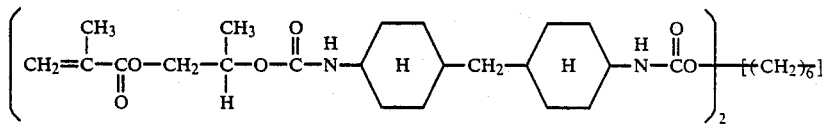

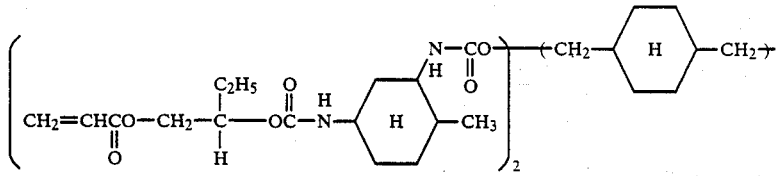

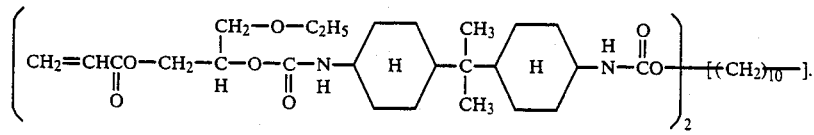
8. An optical disc base plate according to claim 1, wherein compound (3) is bornyl methacrylate, isobornyl methacrylate or tricyclodecanyl acrylate.
9. An optical disc base plate according to claim 1, wherein compound (4) is 1-(4-isopropylphenyl)-2-hydroxy-2-methylpropane-1-one or 1-hydroxycyclohexylphenylketone.
* * * * *

UNITED STATES PATENT AND TRADEMARK OFFICE
CERTIFICATE OF CORRECTION

PATENT NO.   : 4,812,346
DATED        : March 14, 1989
INVENTOR(S)  : Sudo et al.

It is certified that error appears in the above-identified patent and that said Letters Patent is hereby corrected as shown below:

Title page, left-hand column,

"[73]   Assignees:   Hitachi Ltd.; Hitachi Maxwell Ltd., both of Tokyo, Japan"

should read:

--[73]   Assignees:   Hitachi Ltd.; Hitachi Maxell Ltd., both of Tokyo, Japan--

Signed and Sealed this

Twenty-first Day of November, 1989

Attest:

JEFFREY M. SAMUELS

Attesting Officer          Acting Commissioner of Patents and Trademarks